Oct. 30, 1956 R. C. RUSSELL 2,768,532
POWER TRANSMITTING MECHANISM
Filed Sept. 13, 1952 2 Sheets-Sheet 1
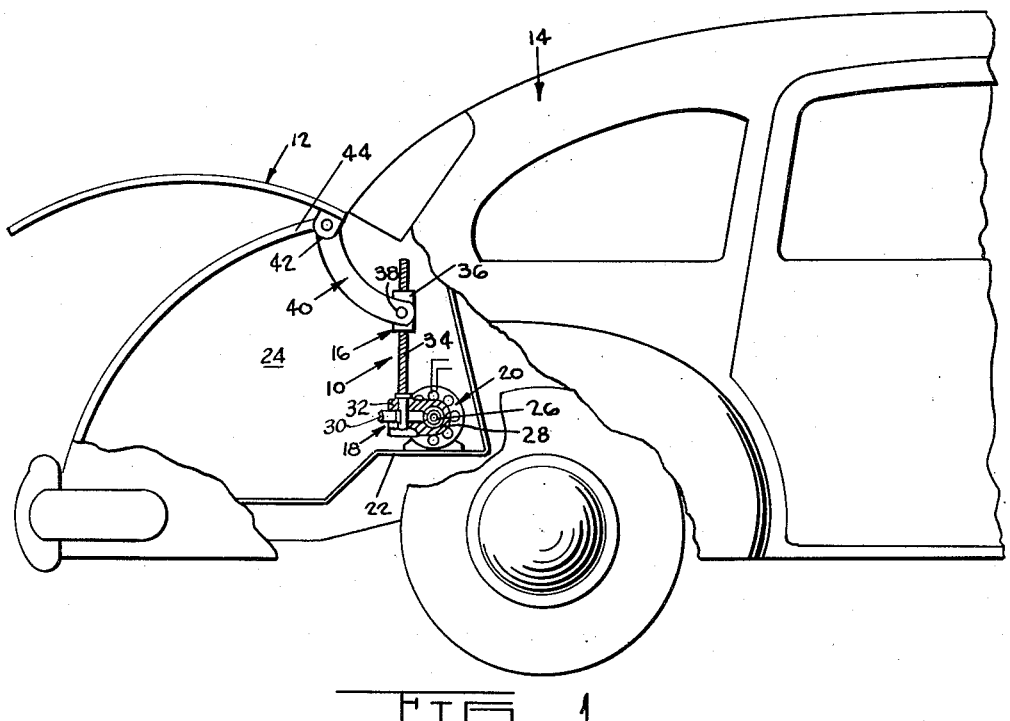
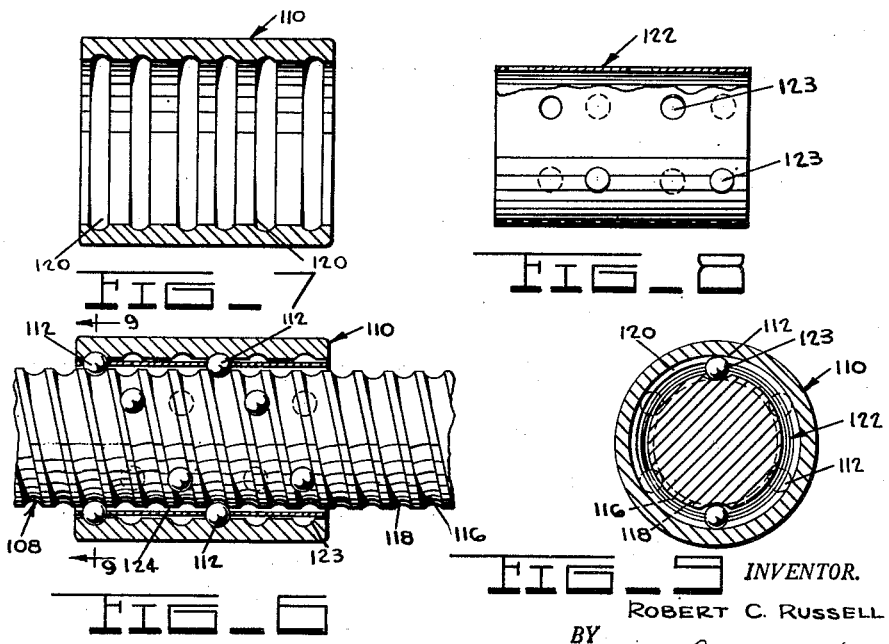
INVENTOR.
ROBERT C. RUSSELL
BY
ATTORNEYS

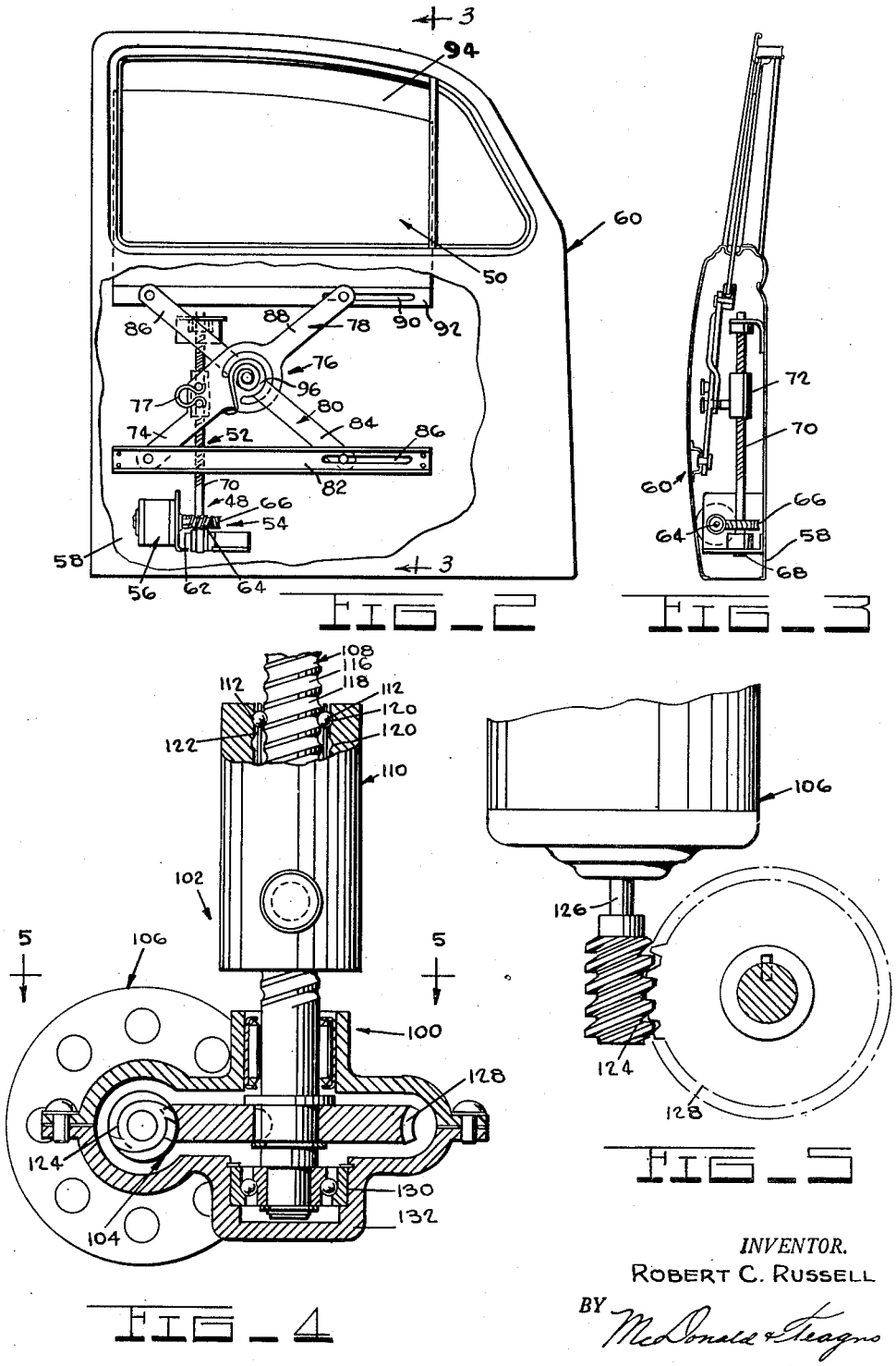

United States Patent Office 2,768,532
Patented Oct. 30, 1956

2,768,532

POWER TRANSMITTING MECHANISM

Robert C. Russell, South Euclid, Ohio, assignor to Eaton Manufacturing Company, Cleveland, Ohio, a corporation of Ohio Application September 13, 1952, Serial No. 309,470

3 Claims. (Cl. 74—424.8)

This invention relates to power transmitting mechanisms and more particularly to such mechanisms embodying nut and screw mechanical movement means as principal elements thereof.

Broadly the invention comprehends the provision of a power transmitting mechanism including a low friction mechanical movement means in the form of a nut and a screw operatively interconnected with one another by a plurality of balls and mechanical advantage means or a change speed means, such as in the form of a gear drive connected to the input member of the mechanical movement means.

In keeping with the great strides made in the adoption of automatic mechanisms as a substitute for manual actuators commonly used in automotive vehicles and the like, for example, in the raising and lowering of windows, in the fore and aft movement of seats, and in the raising and lowering of convertible tops, the automobile manufacturer has strived to offer mechanisms which are efficient in operation and structurally economical. Through the utilization of a mechanical movement nut and screw device of the general type disclosed by my Patent No. 2,446,393 in combination with a gear drive or other suitable mechanical advantage means, a power transmitting mechanism is provided suitable for inclusion in automatic mechanisms for automotive vehicles, intermediate a rotary power source and the element or apparatus to be actuated. Electric motors are commonly employed as a rotary source of power for said automatic mechanisms and in view of the high efficiency afforded by the power transmitting mechanism here devised, the torque capacity rating of the motor is maintained at a minimum resulting in a very economical overall structure.

Among the objects of the invention is the provision of a power transmitting mechanism including a combination mechanical advantage means or change speed means, and a low friction mechanical movement means, that:

(a) Is adaptable to automatic mechanisms for automotive vehicles for convertible top lifting, window position regulation, seat position regulation and other commonly manually operated apparatus of such vehicles;

(b) Affords high efficiency thereby necessitating a minimum of power input;

(c) Is easy to install and service;

(d) Can be constructed to permit or inhibit manual movement of the apparatus to be actuated thereby; and (e) Employs a nut and screw interconnected by a plurality of balls and means for holding the balls in spaced relation and wherein the balls are received between circumferentially directed grooves in the nut and a helical groove or grooves in the screw.

Other objects and advantages of the invention will appear from the following description taken in connection with the drawings forming a part of the specification, and in which:

Fig. 1 is a fragmentary side elevation portion of an automotive vehicle partly broken away incorporating an automatic trunk door opening mechanism therein;

Fig. 2 is a fragmentary side elevation portion of an automotive vehicle partly broken away incorporating an automatic window position regulating mechanism therein;

Fig. 3 is a cross-sectional view taken substantially along lines 3—3 of Fig. 2;

Fig. 4 is a partly cross-sectional view of a combinational mechanical movement and mechanical advantage electric motor driven mechanism adaptable for automatic mechanisms such as the structures of Figs. 1 and 2;

Fig. 5 is a partly fragmentary view taken substantially along lines 5—5 of Fig. 4;

Fig. 6 is a partly fragmentary and cross-sectional view of the mechanical movement device of Fig. 4 and Fig. 5;

Fig. 7 is a cross-sectional view of the outer or nut member of the device of Fig. 6;

Fig. 8 is a cross-sectional view of the ball retainer or cage of the device of Fig. 6; and Fig. 9 is a cross-sectional view taken substantially along lines 9—9 of Fig. 6.

Similar reference characters indicate corresponding parts throughout the several views of the drawings.

With the adoption of automatic mechanisms for the positioning of windows, and seats and the raising and lowering of convertible tops of automotive vehicles as well as the proposed use of said automatic mechanisms as substitution for other manual actuators of said vehicles, electrical motors are finding extensive acceptance as power means therefor. In conjunction with the utilization of electrical motors for said automatic mechanisms, it has been essentially necessary to devise simple, efficient, and economical power transmitting mechanism capable of supplying the desired output at the point of actuation of the apparatus of the vehicle. Although mechanical movement means of the nut and screw variety having balls as interconnections therebetween of the type disclosed by my Patent No. 2,446,393 have commercially proven themselves as low friction, high efficiency power transmitters, they are practically inadequate to fulfill the requirements as power transmitters between a motor source and say a vehicle window for the automatic movement thereof. As such it is requisite to combine with said mechanical movement means a mechanical advantage means or a speed change means, such as a gear drive whereby a desired operation of the vehicle apparatus is obtainable with a minimum of power input. Furthermore by reason of the gearing and mechanical movement combination, it is possible to construct this combination permitting of or inhibiting the manual movement of the automatically operated apparatus, without impairing the efficient operation of the combined mechanism. This is possible by utilizing a like screw-nut-ball mechanism for both purposes while varying the pitch angle of the gears of the gear device so as to make it either reversible or non-reversible.

Referring to the drawings for more specific details of the invention 10 represents generally a power transmitting mechanism employed in conjunction with automatic mechanism for raising and lowering a trunk door 12 of an automotive vehicle 14.

Power transmitting mechanism 10 includes a screw-nut device 16 of the type disclosed in my Patent No. 2,446,393 and a worm gear drive 18.

A reversible electrical motor 20 connected to an electrical power source, not shown, is mounted on the floor 22 of the trunk 24 of vehicle 14 with the output shaft 26 thereof splined or otherwise suitably secured to worm 28 of drive 18, with worm 28 meshing with a gear 30, which gear is journalled for rotation on a support 32. Support 32 is in turn pivotal on shaft 26.

Screw 34 of device 16 is splined or otherwise suitably secured to gear 30 whereas nut 36 axially moveable on and relative to the screw, is connected to one end 38 of a lever 40. Lever 40 has its opposite end 42 connected to the underside of trunk door 12 effective upon the actuation of the motor 20, gear drive 18, screw 34, and nut 36 to move the trunk door 12 about its hinged pivot axis on the vehicle body 44. The automatic operation of the trunk door for the raising or lowering thereof is accomplished by the controlled energization of the motor 20, by way of switch means, not shown, of an electrical circuit for the motor, not shown.

Fig. 2 illustrates the application of a power transmitting mechanism 48, of similar construction as mechanism 10, to the raising and lowering of an automotive vehicle window 50.

Power transmitting mechanism 48 includes a screw-nut device 52 and a worm gear drive 54.

A reversible electrical motor 56 connected in a switch controlled, electrical power supplied electrical circuit, not shown, is mounted on the frame 58 of a vehicle door 60 with the output shaft 62 thereof splined or otherwise suitably secured to worm 64 of drive 54, with worm 64 meshing with a gear 66, which worm is journalled for rotation on a support 68 mounted on the door frame.

Screw 70 of device 52 is splined or otherwise suitably secured to gear 66 whereas nut 72 axially movable on and relative to the screw 70 is connected to one arm 74 of a criss-cross or scissor leverage mechanism 76. A spring member 77 serves to connect the nut to the arm 74 permitting of slight relative movement therebetween.

Leverage mechanism 76 includes mutually pivotally connected levers 78 and 80 with the extremity of arm 74 of lever 78 pivoted upon a fixed axis of a channel plate 82 horizontally secured to door frame 58, and with the extremity of arm 84 of lever 80 slidable in a horizontal slot 86 of channel plate 82. The extremity of arm 88 of the lever 78 is slidable in a horizontal slot 90 arranged in a plate 92 secured to the bottom of window 50 whereas arm 86 of lever 80 is pivotal about a fixed axis on plate 92. Window 50 is in turn vertically slidable in the door frame and is guided therein by appropriate side channeling arranged on opposite sides of opening 94 provided in the door 60.

A coil spring 96 fixed about the pivot of the levers 78 and 80 serves to hold the window firmly in its regulated position by maintaining tension between the levers.

Window 50 is adapted to be automatically raised and lowered in accordance with the controlled operation of the motor for either a forward or reverse direction of operation thereof. As such the rotation of the motor effects rotation of gear 64 which in turn rotates gear 66 and screw 70 secured to the gear. The rotation of screw 70 causes axial movement of nut 72, which movement of nut 72 actuates leverage mechanism 76 effective to lower or raise the window 50 as the case may be.

Figs. 4 and 5 illustrate in detail the substance of the power transmitting mechanisms 10 and 48 wherein for purposes of explanation the mechanism 100 will be numerically identified apart from mechanisms 10 and 48.

Mechanism 100 includes a screw-nut device 102 and a worm gear drive 104 driven by a reversible electrical motor 106.

Screw-nut device 102 which is of the general type defined in my Patent No. 2,446,393, includes an elongated screw 108, a nut 110, a plurality of balls 112 and a ball spacer or cage 122.

Screw 108 has a double lead helical thread thereon formed by helically grooving screw 108 at 116 and 118, with the grooves 116 and 118 being of partially circular cross-sectional configuration and of substantially constant pitch throughout the length of the screw.

Nut 110 is provided in its bore with a plurality of preferably equally axially spaced, circumferential grooves 120, said grooves being of the same cross-sectional configuration as the grooves 116 and 118 in the screw 108.

A plurality of balls 112 are seated in the grooves 116 and 118 and grooves 120 between the screw and nut. Inasmuch as the screw has a double lead helical thread providing grooves 116 and 118 and the number of balls which can be supported in each groove 120 corresponds with the number of helical threads in screw 108, it is preferable to provide two balls in each groove 120. As such the load which each ball 112 must carry is proportionately reduced and dependent on the plural lead of the screw the load capacity of the device 102 is governed thereby. Furthermore, through the use of a double lead thread on screw 108, more stability is lent to the device 102 wherein as shown by Figs. 6 and 9, an effective support is provided between the screw 108 and nut 110 both in an axial as well as radial direction. This structure serves to virtually prevent any binding action occurring between the nut and screw should other than a direct axial thrust be applied thereto.

As a means of insuring a substantially predetermined spaced relation among the balls in relation to their positions in grooves 116, 118 and 120, the spacer or cage 122 in the form of a thin walled tube is arranged in surrounding relationship with respect to the screw concentrically between the screw and nut. The cage 122 provides, at the proper location for each ball, an opening 123 in which each ball is relatively closely but freely rotatably received and through which opening such ball projects both radially inwardly and radially outwardly of the wall of the cage. The cage 122 thus acts to maintain the various balls 112 in their proper relationship with respect to each other about the axis of the screw 108.

Because of the helical thread-circumferential groove arrangement between the screw and nut, during relative rotation of the screw and nut, the balls do not tend to travel axially of the nut but are maintained at the same axial position with respect thereto. In this manner a planetary action is simulated wherein the balls serve as planets, the cage as a support for the planets, the nut as a ring gear and the screw as a sun gear, whereby a mechanical advantage is obtained in the utilization of the device with either the nut or screw having rotation imparted thereto.

For the purpose of preventing slippage under load between the balls and the helical grooves of the nut, it is essential that the angle or pitch of the grooves does not exceed the angle at which the predetermined known coefficient of friction between the balls and helical grooves is insufficient to resist sliding action between the balls and the screw and the nut whereby a positive drive is assured. In the case of making these parts of smooth surfaced hardened steel without provision of lubrication, the maximum pitch angle of grooves 116 and 118 should be approximately 11° if slippage is to precluded under all circumstances. Where it is desirable to provide a screw-nut device 102 that is fully reversible for the axial thrust movement therebetween, preferably the most ideal range of pitch angle is between 8 and 11 degrees.

Worm gear drive 104 includes a worm 124 fixedly secured to output shaft 126 of motor 106 and a gear 128, journalled in bearing 130 mounted on support 132, meshing with worm gear 124. Gear 128 is splined to screw 108 for simultaneous rotation therewith.

Worm gear 124 is adapted to be provided with a pitch or angle commensurate with whether it is desired to be reversible or not, that is permitting of manual actuation of the mechanism 100 if the power fails, whereby or full reversibility the angle or pitch should exceed the angle of repose which in the case of smooth hardened dry steel surfaces should be a minimum of approximately 11°. Where it is desired to have other than full reversibility or non-reversibility the angle should not exceed approximately 11°.

It is desirable in the case of the trunk raising and lowering mechanism of Fig. 1 that the worm gear be provided with an angle greater than the angle of repose so that it will be fully reversible such that together with a fully reversible screw-nut device 102 it will be possible to either open or close the trunk should the power therefor fail. As such an individual can manually move the trunk by virtue of the full reversibility of both the screw-nut device and the worm drive.

Where, in the case of the window position regulating mechanism of Figs. 2 and 3, it is preferred that the window be positioned in any of several and variable positions between open and closed position, it is essential that somewhere in the driving chain non-reversibility is made positive, it becomes practical to make the worm drive non-reversible. This is accomplished by making the angle or pitch of the worm gear 124 less than the angle of repose without altering the screw-nut device in any way and thus maintain the high efficiency of operation as well as the economical structure of the overall combined mechanism.

The screw-nut device 102 has an efficiency of approximately 98% with the parts made of hardened steel and brought to a desirably high state of finish thereby requiring a minimum torque capacity motor or power input means for a given operation.

A typical example of the utilization of the power transmitting mechanism 100 as applied to say fore and aft movement of an automotive vehicle passenger seat, is as follows: A worm drive 124 having a gear reduction of say 6 to 1 and a screw-nut device 102 having a reduction of say 32 to 1 with the worm gear 124 being driven by a motor of say 4000 R. P. M.–6 inch pound torque capacity rating whereby 400 pounds is delivered at the nut 110. With the motor turning at 4000 R. P. M. and with the gear reduction of 6 to 1 the screw is rotated at approximately 666 R. P. M. such that with the screw having 3 threads per inch of length the nut would travel at the rate of 133 inch per minute or roughly 2 inches per second.

Although the power transmitting mechanism herein devised has been disclosed and defined with regard to specific applications thereof and specific structure details thereof, such, for example as the double lead thread on the screw wherein under certain circumstances a single lead thread might be sufficient and the specific arrangement of the helically and circumferentially grooved members wherein they can be reversed in position without departing in principle, they are not to be viewed as limitations of the invention. Accordingly, the appended claims are to be interpreted in the light of the basic concept presented.

What I claim is:

1. A power transmitting mechanism comprising a mechanical movement device including a member having a helical groove in a peripheral surface thereof, a second member having a plurality of like axially spaced circumferential grooves in a peripheral surface thereof in radially opposed relation to the groove in the other member, a plurality of balls seated in the grooves of the members radially between the members and a cage interposed concentrically between the members operatively engaging said balls and maintaining them in predetermined relation to each other, said helical groove of said one member having an angle or pitch greater than the angle of repose and smaller than the angle to cause slippage of said balls between said grooves, a change speed gear drive including a worm and a worm gear meshing with said worm, said worm gear being fixedly secured to said helically grooved member for simultaneous rotation therewith about a common axis and said worm gear having an angle or pitch greater than the angle of repose.

2. A mechanism according to claim 1 wherein the angle or pitch of the helical groove is approximately between 8 and 11 degrees.

3. A mechanism according to claim 1 wherein the members and balls have a coefficient of friction substantially equal to that of smooth surfaced hardened steel without lubrication and wherein the helical groove of the one member has an angle or pitch of approximately between 8 and 11 degrees.

References Cited in the file of this patent

UNITED STATES PATENTS

| 611,832 | Coughlan | Oct. 4, 1898 |
| 924,692 | Schatz | June 15, 1909 |
| 1,139,901 | Pitts | May 18, 1915 |
| 1,148,641 | Welch | Aug. 3, 1915 |
| 1,176,751 | Hardy et al. | Mar. 28, 1916 |
| 2,085,032 | Lucht et al. | June 29, 1937 |
| 2,166,106 | Gormley | July 18, 1939 |
| 2,446,393 | Russell | Aug. 3, 1948 |
| 2,462,779 | Russell | Feb. 22, 1949 |

FOREIGN PATENTS

| 130,529 | Great Britain | Aug. 7, 1919 |